Nov. 24, 1953   L. A. WOODSWORTH   2,660,222
SAFETY SEAT FOR VEHICLES
Filed May 29, 1952   3 Sheets-Sheet 2
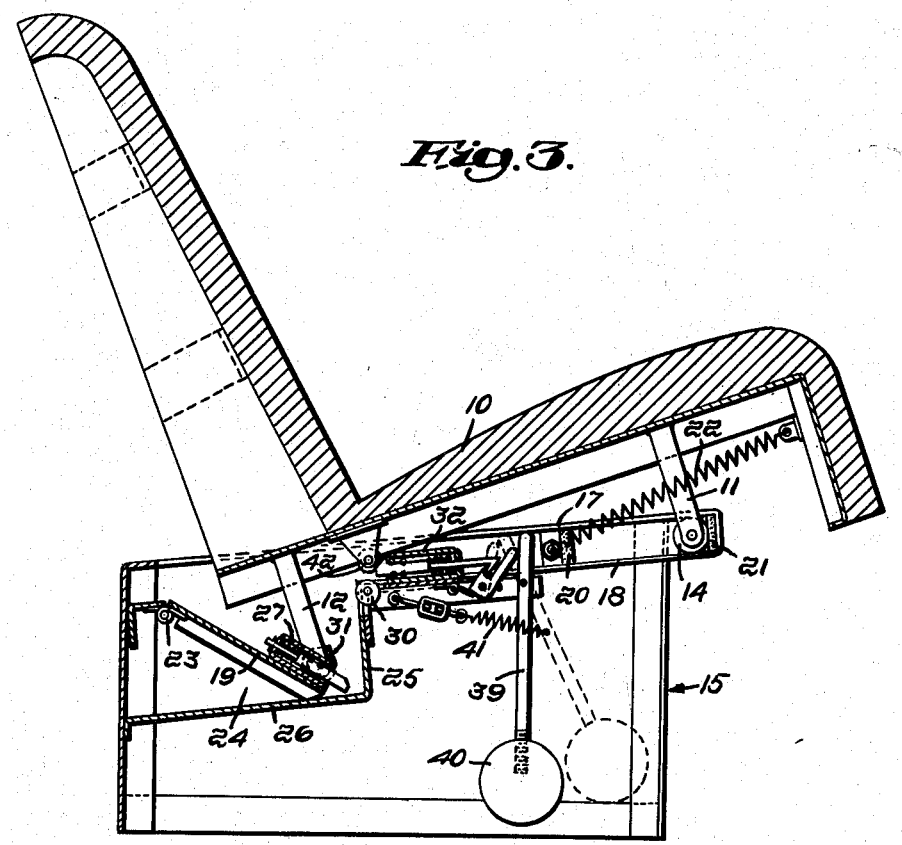
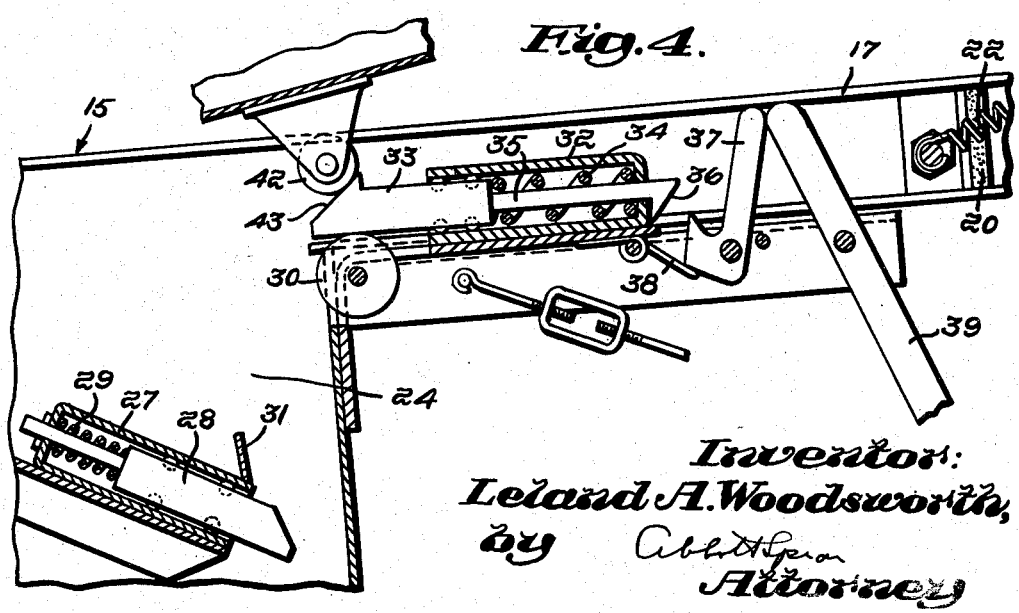
Inventor:
Leland A. Woodsworth,
by Abbott Spear
Attorney Nov. 24, 1953 L. A. WOODSWORTH 2,660,222
SAFETY SEAT FOR VEHICLES
Filed May 29, 1952 3 Sheets-Sheet 3
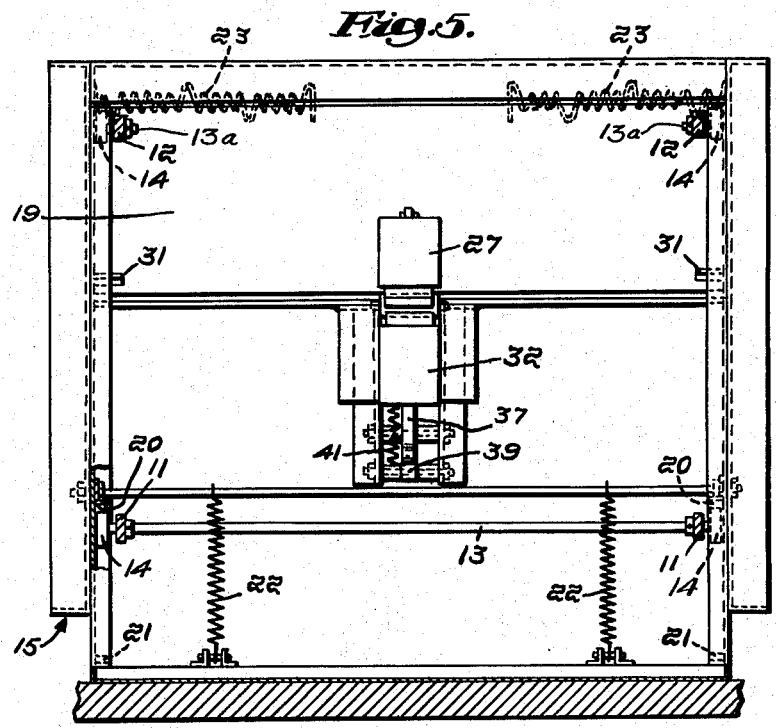
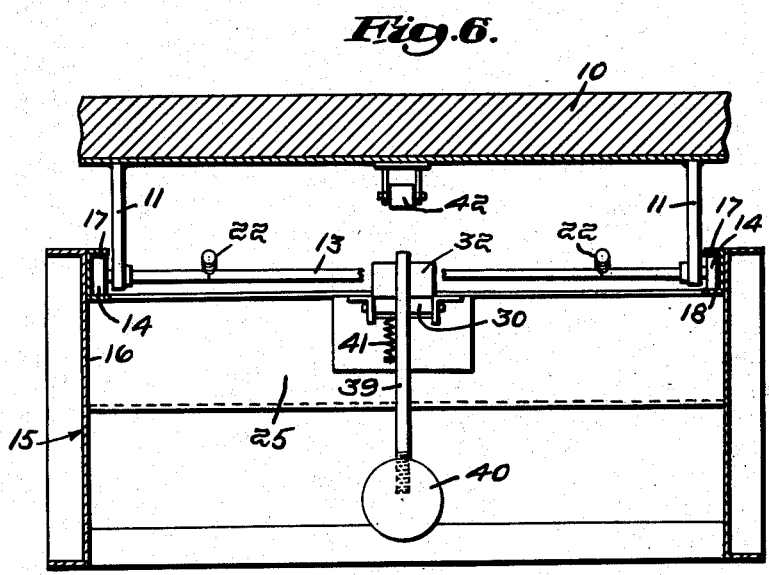
Inventor:
Leland A. Woodsworth,
by Abbott Spear
Attorney Patented Nov. 24, 1953

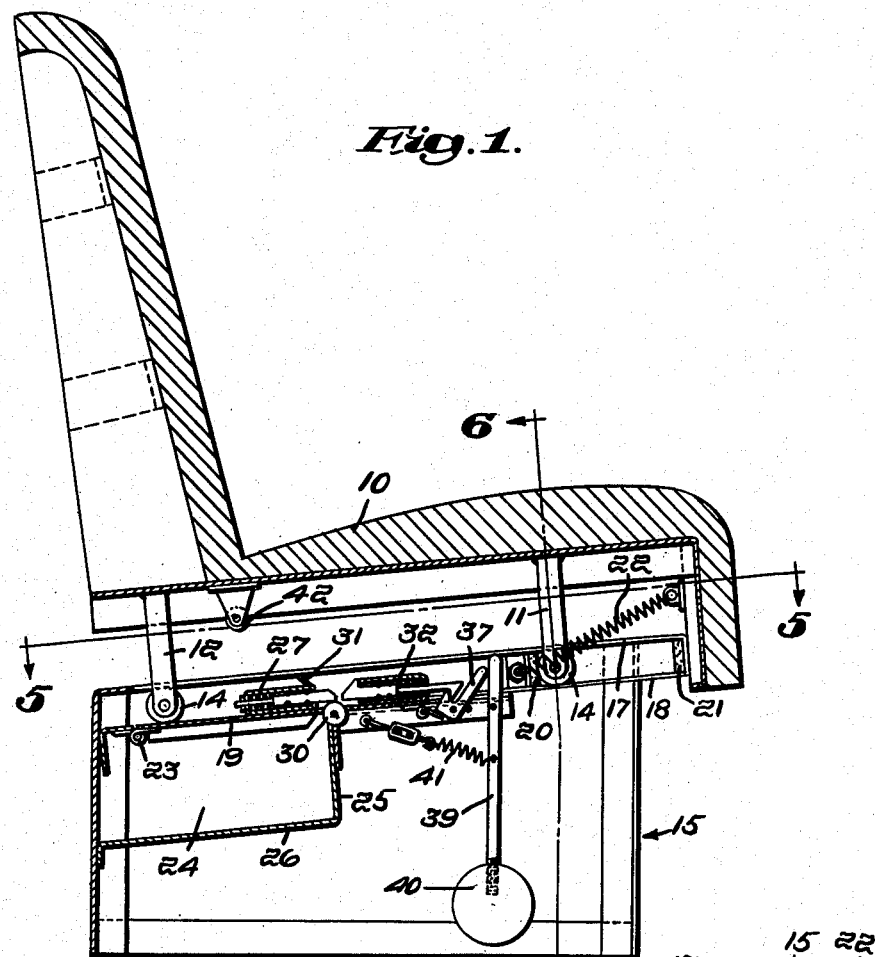

2,660,222

UNITED STATES PATENT OFFICE 2,660,222

SAFETY SEAT FOR VEHICLES

Leland A. Woodsworth, Roxbury, Mass.

Application May 29, 1952, Serial No. 290,711

7 Claims. (Cl. 155—9)

This invention relates to safety seats for vehicles and while it is adapted for other uses, it is herein discussed with particular reference to its use in motor vehicles.

In motor vehicles, there is no protection for the person seated beside the driver in the event of a sudden stop occasioned, for example, by a head-on collision. In such a case, he is thrown forwardly, usually against or through the windshield with serious and often fatal head injuries resulting.

The objective of this invention is to provide means for lessening the risk of such injuries and in accordance with it, there is provided a base to which the front part of the seat member is pivotably connected. The base has an element movable between a first position, in which it holds the rear part of the seat member in its position of use, and a second position in which the rear part of the seat member is free to drop thus causing the seat member to tilt rearwardly into a safety position. A lock releasably holds the element in its first position and means are incorporated that are operable to release the lock as when the motor vehicle suddenly stops. Preferably, the seat member is slidable on the base and on the element, when in its first position, and its sliding is yieldably opposed by resilient means adjusted to yield when the motor vehicle is decelerating at a dangerous rate.

In the accompanying drawings, there is shown an illustrative embodiment of the invention from which these and other of its novel features and advantages will be apparent.

In the drawings:

Fig. 1 is a partly sectioned side view of a safety seat in its position of use,

Fig. 2 is a fragmentary view, on an enlarged scale, showing the lock and the lock releasing means, Fig. 3 is a view similar to Fig. 1 but with the seat member tilted rearwardly, Fig. 4 is a view similar to Fig. 2 but with the lock released, and Figs. 5 and 6 are sections taken along the indicated lines 5—5 and 6—6, respectively, of Fig. 1.

In the embodiment of the invention illustrated by the drawings, the seat member 10 is provided with a pair of front legs 11 and a pair of rear legs 12. The wheels 14 for the front legs are supported by an axle 13 while each of the wheels 14 for the rear legs is rotatably mounted on a stub axle 13ᵃ (see Fig. 5).

The base is generally indicated at 15 and is provided with a forwardly and upwardly inclined track for the wheels 14. The wheel track is established by members secured to the sides 16 of the base 15. These track members are of U-shaped section in the front part of the base 15 to provide upper retaining flanges 17 and wheel supporting flanges 18. In the rear part of the base, the supporting flanges 18 are eliminated and a plate member 19 employed to support the rear wheels. By this construction, the seat member is free to slide forwardly within the limits imposed by the rubber cushioned bumpers 20 and 21, between which the front wheels are located, but such forward movement is opposed by springs 22 attached to the base 15 and the seat member 10. The springs 22 are adapted to yield only if the vehicle is decelerated at a dangerous rate.

The plate member 19 is transversely hinged as at 23 to the rear part of the base chamber 24 established by the transverse partition 25 and the bottom 26. On the plate member 19, there is centrally mounted a cylinder 27 in which there is a slidable latch 28 yieldably backed by the spring 29. The latch 28 engages the upper surfaces of the roller 30, rotatably supported by the partition 25, thereby to hold the plate member 19 in a first position in which the rear wheels are supported to hold the seat member in its position of use. Attached to the plate 19 are wheel stops 31.

Centrally supported by the base 15 forwardly of the partition 25 is a cylinder 32 having a rearwardly disposed slidable latch 33 yieldably backed by the spring 34. The latch 33 has a forwardly disposed arm 35 provided with a hook 36.

A sear 37 is pivotably supported by the base 15 and engages the hook 36 to hold the latch 33 in a retracted or cocked position under the influence of the spring 38. An arm 39, having a weight 40 at its lower end, is pivotably mounted in the base 15. The arm 39, when its weighted end swings forwardly as when the vehicle is suddenly stopped, engages the sear 37 to release the latch 33. A spring 41 yieldably opposes movement of the arm 39 and, in practice, is of such strength as to prevent movement of the arm 39 in all normal, safe stops.

When the latch 33 is released from its normal position, see Figs. 1 and 2, it engages the nose of the latch 28, driving it rearwardly and out of contact with the roller 30. The plate member 19 is then freed and drops into its second position. In the embodiment of the invention shown in the drawings, the seat member 10 will have slid forward relative to the base 15 before the plate member 19 is unlocked but when the plate member 19 swings downwardly, the seat member 10 tilts rearwardly into its safety position, see Fig. 3.

With reference to Figs. 1, 3 and 4, it will be noted that the spring 38 yieldably urges the sear 37 into its operative position and that the seat member 10 is provided with a roller 42 positioned to engage with the exposed end of the latch 33 when that latch is operatively positioned and when the seat member 10 has slid forwardly relative to the base 15. The exposed end of the latch 33 is beveled as at 43 so that when engaged by the roller 42, the latch 33 will thereby be cammed into position to be engaged by the sear 37.

It will also be appreciated that when the seat member 10 tilts rearwardly into its safety position, its rear wheels engage with the wheel stops 31. As the hinge 23 is preferably spring operated, the member 19 is urged upwardly thereby towards its first position.

It will thus be apparent that safety seats in accordance with the invention are adapted for use in any vehicle in which an occupant is exposed to the risk of being thrown from his seat in the event of a sudden stop.

What I therefore claim and desire to secure by Letters Patent is:

1. A safety seat for a vehicle, said seat comprising a seat member and a base on which the front part of the seat member is pivotally supported, an element carried by said base for movement between a first position in which it supports the rear part of said seat member in a position of use and a second position in which the rear chair part is free to drop to tilt the seat member rearwardly into a safety position, a lock releasably holding said element in its first position, and means to release said lock.

2. A safety seat for a vehicle, said seat comprising a seat member and a base on which the front part of the seat member is pivotally supported, an element carried by said base for movement between a first position in which it supports the rear part of said seat member in a position of use and a second position in which the rear chair part is free to drop to tilt the seat member rearwardly into a safety position, a lock releasably holding said element in its first position, and means operable on a predetermined rate of deceleration of the vehicle to release said lock.

3. A safety seat for a vehicle, said seat comprising a seat member and a base on which the seat member is slidably connected, a spring interconnecting said seat member and base and yieldably opposing forward sliding movement of the seat member, an element carried by said base for movement between a first position in which it supports the rear part of said seat member in a position of use and a second position in which the rear chair part is free to drop to tilt the seat member rearwardly into a safety position, a lock releasably holding said element in its first position, and means operable on a predetermined rate of deceleration of the vehicle to release said lock.

4. A safety seat for a vehicle, said seat comprising a seat member and a base on which the front part of the seat member is pivotally supported and including a support, an element carried by said base for movement between a first position in which it supports the rear part of said seat member in a position of use and a second position in which the rear chair part is free to drop to tilt the seat member rearwardly into a safety position, a lock releasably holding said element in its first position, and including a spring-operated latch on said element engaging said support in said first position, a spring operated latch on said base engageable with said first named latch to release it from said support, a sear holding said second named latch against engagement with said first named latch, and means operable on a predetermined rate of deceleration to actuate said sear to release said second named latch.

5. A safety seat for a vehicle, said seat comprising a seat member and a base on which the front part of the seat member is pivotally supported and including a support, an element carried by said base for movement between a first position in which it supports the rear part of said seat member in a position of use and a second position in which the rear chair part is free to drop to tilt the seat member rearwardly into a safety position, a lock releasably holding said element in its first position, and including a spring operated latch on said element engaging said support in said first position, a spring operated latch on said base engageable with said first named latch to release it from said support, a sear holding said second named latch against engagement with said first named latch, and a weighted arm pivotally connected to said base and engageable with said sear to release it from said second named latch.

6. A safety seat for a vehicle, said seat comprising a seat member and a base on which the seat member is slidably connected and including a support, a spring interconnecting said seat member and base and yieldably opposing forward sliding movement of said seat member, an element carried by said base for movement between a first position in which it supports the rear part of said seat member in a position of use and a second position in which the rear chair part is free to drop to tilt the seat member rearwardly into a safety position, a lock releasably holding said element in its first position, and including a spring operated latch on said element engaging said support in said first position, a spring operated latch on said base engageable with said first named latch to release it from said support, a spring controlled sear holding said second named latch against engagement with said first named latch, and means operable on a predetermined rate of deceleration to actuate said sear to release said second named latch, and a member carried by said seat member to engage with said second latch when said seat member is in its safety position to cam said second latch into engagement with said sear.

7. A safety seat for a vehicle, said seat comprising a seat member provided with a pair of front wheels and a pair of rear wheels, and a base including wheel confining and supporting tracks disposed to enable said seat member to slide forwardly, a spring interconnecting said seat member and base and yieldably opposing forward movement of the seat member, an element constituting the supporting part of the rear wheel tracks and carried by said base for movement between a first position in which it supports the rear part of said seat member in a position of use and a second position in which the rear chair part is free to drop to tilt the seat member rearwardly into a safety position, a lock releasably holding said element in its first position, and means operable on a predetermined rate of deceleration of the vehicle to release said lock.

LELAND A. WOODSWORTH.

References Cited in the file of this patent

UNITED STATES PATENTS

| Number | Name | Date |
|---|---|---|
| 2,102,979 | Smith | Dec. 21, 1937 |
| 2,227,717 | Jones | Jan. 7, 1941 |
| 2,335,340 | Koppelman | Nov. 30, 1943 |
| 2,433,950 | Henderson | Jan. 6, 1948 |